United States Patent [19]
Fitch et al.

[11] Patent Number: 5,464,467
[45] Date of Patent: Nov. 7, 1995

[54] ADSORPTIVE SEPARATION OF NITROGEN FROM OTHER GASES

[75] Inventors: Frank R. Fitch, Bedminster; Martin Bülow, Basking Ridge; Adeola F. Ojo, Chatham, all of N.J.

[73] Assignee: The BOC Group, Inc., New Providence, N.J.

[21] Appl. No.: 287,324

[22] Filed: Aug. 8, 1994

Related U.S. Application Data

[63] Continuation-in-part of Ser. No. 195,619, Feb. 14, 1994, abandoned.

[51] Int. Cl.⁶ .................................................. B01D 53/047
[52] U.S. Cl. .............................. 95/98; 95/102; 95/105; 95/130; 95/902; 423/716; 423/328.2; 502/65; 502/73; 502/79
[58] Field of Search .................... 95/96–98, 101–103, 95/105, 130, 902; 502/61, 65, 73, 79; 423/328.1, 328.2, 332, 700, 716

[56]  References Cited

U.S. PATENT DOCUMENTS

| | | | |
|---|---|---|---|
| 2,882,244 | 4/1959 | Milton | 95/902 X |
| 3,140,933 | 7/1964 | McKee | 95/130 |
| 4,137,054 | 1/1979 | Miyake et al. | 95/902 X |
| 4,483,937 | 11/1984 | Liu | 502/73 |
| 4,557,736 | 12/1985 | Sircar et al. | 95/97 |
| 4,684,377 | 8/1987 | Haruna et al. | 95/130 X |
| 4,698,449 | 10/1987 | Imai et al. | 502/65 X |
| 4,775,396 | 10/1988 | Rastelli et al. | 95/902 X |
| 4,859,217 | 8/1989 | Chao | 95/130 |
| 4,925,460 | 5/1990 | Coe et al. | 95/130 X |
| 5,006,496 | 4/1991 | Huizinga et al. | 502/61 |
| 5,013,334 | 5/1991 | Maurer | 95/902 X |
| 5,068,483 | 11/1991 | Barthomeuf et al. | 502/61 X |
| 5,074,892 | 12/1991 | Leavitt | 95/96 |
| 5,152,813 | 10/1992 | Coe et al. | 95/103 |
| 5,171,333 | 12/1992 | Maurer | 95/103 X |
| 5,174,979 | 12/1992 | Chao et al. | 95/96 |
| 5,203,887 | 4/1993 | Toussaint | 95/96 X |
| 5,258,058 | 11/1993 | Coe et al. | 95/96 |
| 5,258,060 | 11/1993 | Gaffney et al. | 95/101 |
| 5,266,102 | 11/1993 | Gaffney et al. | 95/103 |
| 5,268,023 | 12/1993 | Kirner | 95/103 |
| 5,273,945 | 12/1993 | des Courieres et al. | 502/61 |
| 5,292,360 | 3/1994 | Pacaud et al. | 95/96 X |
| 5,292,697 | 3/1994 | Klotz | 502/73 |

FOREIGN PATENT DOCUMENTS 1580928  12/1980  United Kingdom.

OTHER PUBLICATIONS

A. L. Myers, "Activity Coefficients of Mixtures Adsorbed on Heterogeneous Surfaces", Aiche Journal (vol. 29, No. 4), Jul. 1983, pp. 691–693.

*Primary Examiner*—Robert Spitzer
*Attorney, Agent, or Firm*—Coleman R. Reap; Larry R. Cassett

[57]  ABSTRACT

Type X zeolites whose charge-compensating cations are composed of 95 to 50% lithium ions, 4 to 50% of one or more of aluminum, cerium, lanthanum and mixed lanthanides and 0 to 15% of other ions. The zeolites preferentially adsorb nitrogen from gas mixtures.

34 Claims, No Drawings

ADSORPTIVE SEPARATION OF NITROGEN FROM OTHER GASES

RELATED APPLICATIONS

This application is a continuation-in-part of U.S. patent application Ser. No. 08/195,619 filed Feb. 14, 1994.

FIELD OF THE INVENTION

This invention relates to the preparation of novel type X zeolites and more particularly to the preparation of novel nitrogen selective lithium- and trivalent ion-exchanged type X zeolites having improved thermal stability. The invention also relates to the separation of nitrogen from less strongly adsorbed gases by means of the novel lithium- and trivalent cation-exchanged type X zeolites.

BACKGROUND OF THE INVENTION

The separation of nitrogen from other gases, such as oxygen, argon and hydrogen, is of considerable industrial importance. When the separation is conducted on a large scale fractional distillation is often employed. Distillation is quite expensive, however, because of the large initial capital cost of equipment and the considerable energy requirement involved. In recent times other separation methods have been investigated in efforts to reduce the overall cost of such separations.

An alternative to distillation that has been used to separate nitrogen from other gases is adsorption. For example, sodium X zeolite, described in U.S. Pat. No. 2,882,244 to Milton, has been used with some success for the adsorptive separation of nitrogen from oxygen. A disadvantage of the use of sodium X zeolite for the separation of nitrogen from oxygen is that it has low separation efficiency for nitrogen separation.

According to McKee, U.S. Pat. No. 3,140,933, an improvement in nitrogen adsorption results when some of the base sodium ions are replaced with lithium ions. This patent discloses that type X zeolite having base ions replaced by lithium ions can be effectively used to separate nitrogen from oxygen at temperatures up to 30° C. Since the ion-exchange is not exhaustive and the X zeolites were synthesized using sodium as the templating agent, the partially ion-exchanged material used is mixed sodium/lithium zeolite.

U.S. Pat. No. 4,859,217 discloses that very good adsorptive separation of nitrogen from oxygen can be obtained at temperatures of 15° to 70° C. using a type X zeolite which has more than 88% of its ions present as lithium ions, particularly when a zeolite having an aluminum to silicon atomic ratio of 1 to 1.25 is used.

Unfortunately, lithium exchanged type X zeolite has a very high affinity for water, and adsorbed water, even in small amounts, seriously diminishes the adsorption capacity of the zeolite. Accordingly, to secure optimum adsorption performance, it is necessary to activate the zeolite by heating it to temperatures as high as 600° to 700° C. to drive off as much adsorbed water as possible. Since lithium exchanged type X zeolites are not stable at temperatures above about 740° C. activation of these adsorbents must be carefully controlled to prevent deterioration of the adsorbent.

U.S. Pat. No. 5,174,979 asserts that lithium/alkaline earth metal X zeolites having lithium/alkaline earth metal molar ratios in the range of about 95:5 to 50:50 have thermal stabilities greater than the corresponding pure lithium zeolites and good adsorption capacities and selectivities.

U.S. Pat. No. 5,152,813 discloses the adsorption of nitrogen from gas mixtures using crystalline X-zeolites having a zeolitic Si/Al ratio $\leq 1.5$ and at least binary ion exchange of the exchangeable ion content with between 5 and 95% lithium and between 5 and 95 % of a second ion selected from calcium, strontium and mixtures of these, the sum of the lithium and second exchangeable ion being at least 60%.

Although X-type zeolites that are highly ion exchanged with lithium ions have excellent nitrogen adsorption properties they are expensive to produce. There is a need for adsorbents which have superior thermal stability and nitrogen adsorption properties and which can be produced at reasonable costs. The present invention provides a family of adsorbents having these characteristics.

SUMMARY OF THE INVENTION

According to a first aspect of the invention there are presented novel zeolitic compositions which have superior thermal stability characteristics and nitrogen adsorptive selectivity. The novel zeolites are type X zeolites whose cations comprise, on an equivalents basis, about 50 to about 95% lithium, about 4 to about 50% of one or more selected trivalent ions, and 0 to about 15% and preferably 0 to about 10% of residual ions. The trivalent ions are selected from aluminum, scandium, gallium, indium, yttrium, iron (III), chromium (III), single lanthanides, mixtures of two or more lanthanides and mixtures of these. The optional residual ions are generally one or more of sodium, potassium, ammonium, hydronium ions. Calcium, strontium, magnesium, barium, zinc and copper (II) ions may also be present as charge-compensating cations at concentrations less than about 5%.

The minimum total percentage of lithium and trivalent ions associated with the zeolite as charge-compensating cations, on an equivalents basis, is 85% and preferably 90%. The charge-compensating cations present in the zeolite other than lithium and the trivalent ions mentioned above (if any such other cations are present) may be one or more of the above-mentioned residual ions, or they may be one or more of any other cations, or they may be mixtures of any of these. The only restriction on these other cations is that they must not adversely affect the utility of the zeolite as an adsorbent for nitrogen, or otherwise adversely affect the zeolite. These other cations may be present in an amount up to about 15% of the total of charge-compensating cations, on an equivalents basis. In most preferred embodiments of the invention, the minimum percentage of lithium and trivalent ions serving as charge-compensating cations is 95%.

The silicon to aluminum atomic ratio of the zeolites of the invention is broadly in the zeolite X range, i.e. in the range of about 0.9 to 1.5 and is preferably in the range of about 0.9 to 1.25. The most preferred zeolites are the low silicon X type zeolites (commonly referred to as LSX zeolite). These have a silicon to aluminum atomic ratio in the range of about 0.9 to 1.1.

In a preferred embodiment the zeolite is one in which, on an equivalents basis, about 70 to about 95% of the charge-compensating cations are lithium ions, about 5 to about 30% are trivalent ions, and 0 to about 10% are residual ions.

In another preferred embodiment the trivalent ions are selected from aluminum, cerium, lanthanum, mixtures of two or more lanthanides in which the combined weight of lanthanum, cerium, praseodymium and neodymium ions present in the mixture comprises at least 50 % of the total lanthanide ions on a molar basis, and mixtures of these.

In another preferred embodiment the residual ions are selected from calcium, strontium, magnesium, zinc and mixtures of these, and these may be present in amounts less than about 5% based on the total number of charge-compensating ions associated with the zeolite.

In a most preferred embodiment, the charge-compensating cations consist substantially only of lithium and one or more of the above-mentioned trivalent ions. In other words, the zeolite contains no more than about 1% residual ions as charge-compensating cations.

According to a second aspect of the invention, the above-described zeolite is used as an adsorbent to separate nitrogen from a gas mixture. The separation is effected by passing the gas mixture through at least one adsorption zone containing the adsorbent thereby preferentially adsorbing nitrogen from said gas mixture. The adsorption process is generally carried out at a temperature in the range of about −190° to about 70° C. and an absolute pressure in the range of about 0.7 to 15 bar.

In a preferred embodiment of this aspect of the invention, the adsorption process is cyclical and comprises the above-described adsorption step and the step of desorbing nitrogen from the adsorption zone(s). Preferred cyclical processes include pressure swing adsorption, temperature swing adsorption and combinations of these.

When the adsorption process is pressure swing adsorption, the adsorbent is generally regenerated at an absolute pressure in the range of about 100 to about 5000 millibar, and when it is temperature swing adsorption is generally regenerated at a temperature in the range of about 0° to about 300° C.

In other preferred embodiments the adsorption step is carried out at a temperature in the range of about −20° to about 50° C. and an absolute pressure in the range of about 0.8 to 10 bar.

In a most preferred embodiment of the invention, the adsorption process is used for separating nitrogen from a gas mixture comprising nitrogen and one or more of oxygen, argon, helium, neon and hydrogen.

In other preferred embodiments of the invention the adsorption bed regeneration step is effected by vacuum means or by purging the bed with one or more of an inert gas, the nonadsorbed gas product from the adsorption system, or by combinations of vacuum and purge regeneration; and bed repressurization is at least partly effected using the nonadsorbed gas from the adsorption system.

DETAILED DESCRIPTION OF THE INVENTION

The invention is useful for the separation of nitrogen from a gas mixture. The separation is effected by adsorption using an adsorbent which selectively adsorbs nitrogen relative to other gases in the mixture. Typical separations include the separation of nitrogen from the other components of air, such as oxygen and/or argon, helium, neon, hydrogen, etc. Preferred separations include the separation of nitrogen from oxygen or argon.

The novel adsorbents of the invention are comprised of type X zeolite having as most of the charge-compensating cations, a mixture of lithium ions and trivalent ions selected from aluminum, scandium, gallium, yttrium, iron (III), i.e. ferric ion, chromium (III), i.e. chromic ion, indium ions and ions of the lanthanide series. The lanthanide series ions include lanthanum, cerium, praseodymium, neodymium, promethium, samarium, europium, gadolinium, terbium, dysprosium, holmium, erbium, thulium, ytterbium, and lutetium ions. Mixtures of any two or more of the above trivalent ions can also be used to make the adsorbent of the invention. Preferred trivalent cations include aluminum, cerium, lanthanum and lanthanide mixtures in which the combined concentrations of lanthanum, cerium, praseodymium and neodymium totals at least about 50%, and preferably at least about 75% of the total number of lanthanide ions in the mixtures.

Type X zeolite is crystalline aluminosilicate having a silicon to aluminum atomic ratio of 1.5 or less. The ratio of silicon to aluminum in type X zeolite varies from a theoretical minimum of 1.0 to about 1.5, however due to defects in the structure of the zeolite, impurities, such as occluded alumina and/or aluminates, errors in measurement and defects in the structure, apparent silicon to aluminum ratios of type X zeolites as low as 0.9 have been measured. For purposes of this discussion, it is assumed that the minimum silicon to aluminum ratio of type X zeolite is 0.9. A preferred type X zeolite for use in preparing the novel adsorbents of the invention is that having a silicon to aluminum atomic ratio less than about 1.25. The most preferred type X zeolite is that having a silicon to aluminum ratio of about 0.9 to about 1.1 0, which is commonly referred to as low silicon X (LSX) zeolite.

The adsorbents of the invention are generally made from a base type X zeolite which usually originally has sodium and/or potassium ions as the charge-compensating cations, i.e. ions which compensate the negative charge of the aluminosilicate lattice. It may be desirable to convert all of the cations to a single cation species, preferably the sodium or ammonium ion form, prior to preparation of the adsorbents of the invention. In the broadest embodiment of the invention, about 95 to about 50% of the charge-compensating cations are lithium ions, about 4 to about 50% of the cations are trivalent ions, and 0 to about 15% are residual ions, i.e. ions associated with the zeolite as charge-compensating cations other than lithium and the above-mentioned trivalent ions. The residual ions may be present as a result of the procedure used to manufacture the cation exchanged type X zeolite, or they may be intentionally introduced into the zeolite to further modify its properties. In typical embodiments of the invention, about 70 to about 95% of the chargecompensating cations are lithium ions, about 5 to about 30% of the cations are trivalent ions, and 0 to about 10% are residual ions. Generally, the residual ions will be sodium, potassium, ammonium, hydronium, calcium, magnesium ions or mixtures of these. In some cases it may be desirable to use divalent cations, such as magnesium, calcium, strontium, barium, zinc or copper (11) ions as part or all of the residual ions, since divalent ion-exchanged type X zeolite has better nitrogen adsorption properties than do the sodium and potassium ion forms of this type X zeolite. As noted above it is preferred to limit the presence of divalent cations to less than about 5% of the total charge-compensating cations.

The novel adsorbents of the invention can be prepared, for example, by cation exchanging the adsorbent with a solution of lithium compounds and solutions of compounds of the above-mentioned trivalent ions. It is preferable, although not absolutely necessary, to use aqueous solutions of the exchange ions. Any water-soluble compound of the exchanging ions can be used. The preferred water soluble compounds of the ions are the salts, particularly the chlorides, sulfates and nitrates. The most preferred salts are the chlorides because of their high solubilities and ready availability.

The order of cation exchange is not critical. One procedure is to first exchange the base adsorbent with lithium ions and then to exchange the lithium-exchanged adsorbent with one or more trivalent ions. In some cases it may be desirable to first cation exchange the trivalent ion to the desired exchange level, then optionally calcine the partly exchanged zeolite and then conduct the lithium exchange. A third method is to simultaneously exchange the base adsorbent with lithium ions and the desired one or more trivalent ions.

The zeolites of the present invention can have a variety of physical forms, and the exact physical form of the product may affect its utility in PSA processes. When the zeolites of the present invention are to be used in industrial adsorbers, it may be preferred to aggregate (e.g. pelletize) the zeolite to control the macropore diffusion, or else in an industrial size adsorption column pulverulent zeolite may compact, thereby blocking, or at least significantly reducing flow through, the column. Those skilled in molecular sieve technology are aware of conventional techniques for aggregating molecular sieves; such techniques usually involve mixing the molecular sieve with a binder, which is typically a clay, forming the mixture into an aggregate, typically by extrusion or bead formation, and heating the formed molecular sieve/binder mixture to a temperature of about 600°–700° C. to convert the green aggregate into one which is resistant to crushing. The binders used to aggregate the zeolites may include clays, silicas, aluminas, metal oxides and mixtures thereof. In addition, the zeolites may be formed with materials such as silica-alumina, silica magnesia, silica-zirconia, silica-thoria, silica-beryllia, and silica-titania, as well as ternary compositions, such as silica-alumina-thoria, silica-alumina-zirconia zirconia and clays present as binders. The relative proportions of the above materials and the zeolites may vary widely. Where the zeolite is to be formed into aggregates prior to use, such aggregates are desirably about 0.5 to about 5 mm in diameter. Aggregation may be effected before or after the lithium and trivalent metal ion-exchanges required to produce the zeolites of the present invention, i.e. one can first produce the lithium/trivalent metal zeolite and then effect aggregation, or one can use as the starting material for the ion-exchanges an X zeolite which is already in aggregate form. In general, the latter is preferred, since sodium X zeolite is more thermally stable than the lithium/trivalent metal zeolites of the present invention and hence less susceptible to damage from the high temperatures used in the aggregation process. However, it should be noted that activation of the lithium/trivalent metal zeolite is required even if the sodium zeolite used as starting material has been activated during the aggregation process.

The temperature at which the adsorption step of the adsorption process is carried out depends upon a number of factors, such as the particular gases being separated, the particular adsorbent being used, and the pressure at which the adsorption is carried out. In general, the adsorption step is carried out at a temperature of at least about of −190° C., preferably at a temperature of at least about −20° C., and most preferably at a temperature of at least about 15° C. The adsorption is generally carried out at temperatures not greater than about 70° C, and preferably not greater than about 50° C., and most preferably not greater than about 35° C.

The adsorption step of the process of the invention can be carried out at any of the usual and well known pressures employed for gas phase temperature swing adsorption and pressure swing adsorption processes. Typically the minimum absolute pressure at which the adsorption step is carried out is generally about 0.7 bar, preferably about 0.8 bar and most preferably about 0.9 bar. The adsorption is generally carried out at pressures not greater than about 15 bar, and preferably not greater than about 10 bar, and most preferably not greater than about 4 bar.

When the adsorption process is PSA, the pressure during the regeneration step is reduced, usually to an absolute pressure in the range of about 100 to about 5000 millibar, and preferably to an absolute pressure in the range of about 175 to about 2000 millibar. and most preferably to an absolute pressure in the range of about 200 to about 1100 millibar. When the adsorption process is TSA, the bed temperature is raised during bed regeneration. The regeneration temperature can be any temperature below which the adsorbent begins to degenerate, In general, the temperature of the adsorbent is usually raised during regeneration to a value in the range of about 0° to about 300° C., is preferably raised to a value in the range of about 25° to about 250° C., and is most preferably raised to a value in the range of about 70° to about 180° C. The regeneration procedure may be a combination of PSA and TSA, in which case both the pressure and temperature used during regeneration will be varied within the above-stated ranges.

The invention is further illustrated in the following examples wherein, unless otherwise stated, parts, percentages, and ratios are on a volume basis.

EXAMPLE 1

Preparation of trivalent ion, lithium LSX and X Low silicon X (LSX) was synthesized with a Si/Al atomic ratio of 1.0 according to the procedures described by G. H. Kuhl in UK 1,580,928. Sodium LSX zeolite was then prepared by ion-exchange of the synthetic sodium, potassium LSX zeolite using four static exchanges with 20 ml of 1.0N NaCl solution per g of zeolite at 80° C. After each exchange, the sample was washed with aqueous NaOH (0.01 N). The resulting sodium LSX was made into laboratory pellets by compaction in a die (without a binder) followed by crushing and sieving to 20–40 mesh size. 13X PSO2 HP a commercial zeolite X (with an approximate zeolitic Si/Al ratio of 1.25) supplied by UOP Inc. as 8×10 mesh beads was used as the base zeolite for a further range of trivalent ion, lithium X materials of this invention.

The lithium forms of X or LSX were made by pumping four-fold excesses of 0.09 N LiCl solution (adjusted to a pH value of 9 with LiOH) once through the base sodium ion form pellets over a period of 72 hours at 80° C. In the case of the commercial X pellets 2 further exchanges with 4- fold excesses of LiCl were required to achieve the desired exchange level of >97% of the base sodium ions. The resulting lithium ion-exchanged samples were filtered but not water washed to limit hydronium ion exchange. Cerium or lanthanum, lithium LSX samples were prepared by contacting said LiLSX sample with 0.1N aqueous solutions of the appropriate lanthanide chlorides (with pH values in the range 5.5–6.5) containing the stoichiometric quantities of the trivalent ion necessary to achieve the desired level of exchange of the trivalent ion. For the trivalent ion exchanges the effluent from the column was continuously recycled back to the vessel containing the exchange solution and the exchange was carried out at ambient temperature for 24 to 30 hours. The procedure for preparing cerium or lanthanum, lithium X was identical except that longer contact times were required (45–72 hours). Aluminum, lithium X and LSX samples were prepared using the same procedure except that 0.04N aqueous aluminum sulphate (with a pH value in the range 3.9–5) was used and the exchange was carried out at 70° C. for a period of 20 to 24 hours.

The compositions of trivalent ion, lithium X and LSX samples prepared according to the procedures of this Example are given in Table 1, where the measured equivalents of ion exchangeable cations are normalized to unity. Table 1A shows the same data but expressed in terms of the ratios of equivalents of the measured ion exchangeable cations to the framework aluminum content.

The samples were analyzed by Inductively Coupled Plasma Atomic Emission Spectroscopy (ICP-AES) using an ARL-3510 Sequential ICP spectrometer.

In the case of the sample labelled ReLiLSX (81%:15%) NC, NaLSX was first exchanged with a commercial mixed rare earth chloride solution supplied by Moly Corp., Inc., (with composition approximately 67% $LaCl_3$, 23% $NdCl_3$, 9% $PrCl_3$, 1% $CeCl_3$) and then lithium exchanged to the final product without an intermediate calcination step.

TABLE 1

Normalized Composition of trivalent ion, lithium X and LSX samples of this invention.

| Sample | $Tr^{3+}$ cation equivalent fraction | $Li^+$ cation equivalent fraction | $Na^+$ cation equivalent fraction |
|---|---|---|---|
| LiCeX(93%:4%) | 0.04 | 0.93 | 0.03 |
| LiCeX(92%:6%) | 0.06 | 0.92 | 0.02 |
| LiAlX(77%:20%) | 0.20 | 0.77 | 0.02 |
| LiCeLSX(84%:16%) | 0.16 | 0.84 | <0.003 |
| LiAlLSX(83%:15%) | 0.15 | 0.83 | 0.02 |
| RELilLSX(81%:15%) NC | 0.15 | 0.81 | 0.04 |

TABLE 1A

Composition of trivalent ion, lithium X and LSX samples of this invention.

| Sample | $Tr^{3+}/Al_f$ equivalent ratio | $Li^+/Al_f$ equivalent ratio | $Na^+/Al_f$ equivalent ratio | $H^+/Al_f$ equivalent ratio |
|---|---|---|---|---|
| LiCeX(93%:4%) | 0.04 | 0.87 | 0.03 | 0.06 |
| LiCeX(92%:6%) | 0.06 | 0.87 | 0.02 | 0.05 |
| LiAlX(77%:20%) | 0.18 | 0.70 | 0.02 | 0.10 |
| LiCeLSX(84%:16%) | 0.14 | 0.79 | <0.003 | 0.07 |
| LiAlLSX(83%:15%) | 0.14 | 0.75 | 0.02 | 0.10 |
| RELiLSX(81%:15%) NC | 0.15 | 0.81 | 0.04 | 0.01 |

EXAMPLE 2

Adsorption isotherms for nitrogen ($N_2$) and oxygen ($O_2$) on trivalent ion, lithium LSX and X samples were measured gravimetrically using a Cahn 2000 Series microbalance enclosed in a stainless steel vacuum/pressure system. Pressure measurements in the range 1–10000 mbar were made using a MKS Baratron. About 100 mg of the sample was carefully evacuated and its temperature increased to 450° C. at a rate of 1°–2° C. per minute. The adsorption isotherms for nitrogen and oxygen were measured at 25° C. in the pressure range 20–6600 mbar for nitrogen and 20–2000 mbar for oxygen and the data fitted to a single or multiple site Langmuir isotherm model. The fits to the nitrogen data were used to calculate the nitrogen capacities of the samples at 1 atmosphere, and their effective capacities for nitrogen at 25° C. The effective nitrogen capacity defined as the difference between the nitrogen capacity at 1250 mbar and that at 250 mbar gives a good indication of the capacity of the adsorbent in a PSA process operated between upper and lower pressures in this range. The selectivities of the samples for nitrogen over oxygen in air at 1500 mbar and 25° C. were derived from the pure gas isotherms for nitrogen and oxygen using Langmuir mixing rules (Ref. e.g. A. L. Myers: AIChE: 29(4), (1983), p691–693). The usual definition for selectivity was used, where the selectivity (S) is given by:

$$S=(x_{N2}/y_{N2})/(x_{O2}/y_{O2})$$

where $x_{N2}$ and $x_{O2}$ are the mole fractions of nitrogen and oxygen, respectively, in the adsorbed phase, and $y_{N2}$ and $y_{O2}$ are the mole fractions of nitrogen and oxygen, respectively, in the gas phase.

The adsorption results for the trivalent ion, lithium X and LSX samples of Example 1 are given in Table 2.

TABLE 2

Adsorption Data for trivalent, lithium X and LSX samples of this invention.

| Sample | $N_2$ Uptake 1 atm. mmol/g | Effective $N_2$ Uptake 1250–250 mbar mmol/g | Selectivity $N_2/O_2$ 1500 mbar (air) |
|---|---|---|---|
| LiCeX(93%:4%) | 0.81 | 0.57 | 8.3 |
| LiCeX(92%:6%) | 0.82 | 0.58 | 8.6 |
| LiAlX(77%:20%) | 0.65 | 0.46 | 8.3 |
| LiCeLSX(84%:16%) | 0.84 | 0.62 | 9.3 |
| LiAlLSX(83%:15%) | 1.09 | 0.81 | 10.4 |
| RELiSX(81%:15%) NC | 1.03 | 0.77 | 9.3 |

EXAMPLE 3

Thermal Stability of trivalent, lithium LSX and X

Differential Thermal Analysis (DTA) was performed on the trivalent ion, lithium X and LSX samples in air using a Shimadzu DTA-50 Differential Thermal Analyzer. A heating rate of 20° C./min from ambient temperature to 1200° C., a purge gas flow rate of 100 ml/min and sample weights in the range 2 to 3.1 mg were used.

The results for the trivalent ion, lithium X and LSX samples of Example 1 are given in Table 3.

TABLE 3

Thermal Stabilities of trivalent ion, lithium X and LSX samples of this invention.

| Sample | Peak No. 1 °C. | Peak No. 2 °C. | Peak No. 3 °C. |
|---|---|---|---|
| LiCeX(93%:4%) | 784 | 814 | — |
| LiCeX(92%:6%) | 788 | — | — |
| LiAlX(77%:20%) | 802 | 991 | — |
| LiCeLSX(84%:16%) | 805 | 855 | — |
| LiAlLSX(83%:15%) | 786 | 844 | — |
| RELiSX(81%:15%) NC | 794 | 863 | 942 |

EXAMPLE 4

Isotherms of comparative trivalent ion, sodium X and LSX

Comparative cerium or aluminum, sodium LSX samples were prepared by following the procedures outlined in Example 1 except that in these cases the base sodium forms of X and LSX were not lithium exchanged prior to the exchange with identical quantities of the trivalent ions.

The adsorption data for these samples is given in Table 4.

TABLE 4

Adsorption Data (25° C.) for comparative trivalent ion, sodium X and LSX Samples of prior art

| Sample | $N_2$ Uptake 1 atm. mmol/g | Effective $N_2$ Uptake 1250–250 mbar mmol/g | Selectivity $N_2/O_2$ 1500 mbar (air) |
|---|---|---|---|
| Commercial 13X Zeolite | 0.35 | 0.33 | 3.7 |
| NaCeX | 0.31 | 0.37 | 3.5 |
| NaAlX | 0.24 | 0.23 | 3.3 |
| LiCeX(93%:4%) | 0.81 | 0.57 | 8.3 |
| LiCeX(92%:6%) | 0.82 | 0.58 | 8.6 |
| LiAlX(77%:20%) | 0.65 | 0.46 | 8.3 |
| LSX(42%) | 0.41 | 0.39 | 4.2 |
| NaCeLSX | 0.28 | 0.26 | 2.4 |
| LiCeLSX(84%:16%) | 0.84 | 0.62 | 9.3 |
| LiAlLSX(83%:15%) | 1.09 | 0.81 | 10.4 |
| RELiSX(81%:15%) NC | 1.03 | 0.77 | 9.3 |

The trivalent ion, lithium X or LSX samples of this invention (rows 4 to 6 and 9 to 11, respectively of Table 4) have significantly greater "effective" nitrogen capacities and nitrogen/oxygen selectivities than trivalent ion, sodium samples of the prior art with equivalent trivalent ion levels.

EXAMPLE 5

Isotherms and Thermal Stabilities of comparative lithium sodium X and LSX

LiLSX and LiX were prepared using the ion exchange procedures described in detail in Example 1 but in which the final trivalent ion exchange step was omitted. Samples with reduced lithium exchange levels were made by reducing the quantity of LiCl passed through the base NaLSX or commercial 13X zeolite.

The compositions of the comparative lithium sodium X and LSX samples are given in Table 5. The adsorption data for these samples are given in Table 6 and the thermal stability data in Table 7.

TABLE 5

The compositions of the comparative lithium sodium X and LSX samples.

| Sample | $Tr^{3+}$ cation equivalent fraction | $Li^+$ cation equivalent fraction | $Na^+$ cation equivalent fraction |
|---|---|---|---|
| LiX(68%) comparative ex. | none detected | 0.68 | 0.32 |
| LiX(85%) comparative ex. | none detected | 0.85 | 0.15 |
| LiX(94%) comparative ex. | none detected | 0.94 | 0.06 |
| LiX(97%) comparative ex. | none detected | 0.97 | 0.03 |
| LSX comparative ex. | none detected | none detected | >0.99 |
| LiLSX(79%) comparative ex. | none detected | 0.79 | 0.21 |
| LiLSX(99%) comparative ex. | none detected | >0.99 | <0.003 |

TABLE 6

Adsorption Data (25° C.) for comparative lithium sodium X and LSX samples of prior art.

| Sample | $N_2$ Uptake 1 atm. mmol/gm | Effective $N_2$ Uptake 1250–250 mbar mmol/g | Selectivity $N_2/O_2$ 1500 mbar (air) |
|---|---|---|---|
| Commercial 13X Zeolite | 0.35 | 0.33 | 3.7 |
| LiX(68%) | 0.27 | 0.25 | 3.4 |
| LiX(85%) | 0.50 | 0.39 | 5.5 |
| LiX(94%) | 0.63 | 0.47 | 7.6 |
| LiX(97%) | 0.82 | 0.58 | 10.2 |
| LiCeX(93%:4%) | 0.81 | 0.57 | 8.3 |
| LiCeX(92%:6%) | 0.82 | 0.58 | 8.6 |
| LiAlX(77%:20%) | 0.65 | 0.46 | 8.3 |
| LSX | 0.41 | 0.39 | 4.2 |
| LiLSX(79%) | 0.56 | 0.49 | 5.9 |
| LiLSX(99%) | 1.19 | 0.89 | 9.7 |
| LiCeLSX(84%:16%) | 0.84 | 0.62 | 9.3 |
| LiAlSX(83%:15%) | 1.09 | 0.81 | 10.4 |
| RELiLSX(81%:15%) NC | 1.03 | 0.77 | 9.3 |

The nitrogen sorption capacities of the X- and LSX- based samples of this invention (rows 6 to 8 and 12 to 14, respectively of Table 6) exceed those of the prior art adsorbents with equivalent lithium content and approach that of the best prior art LiLSX sample (line 11 of Table 6). The separation factors of the samples of this invention are significantly higher than those for the prior art samples with equivalent lithium cation content and they are as high as that for the best prior art LiLSX adsorbent (line 11 of table 6).

TABLE 7

Thermal Stability of lithium sodium X and LSX samples of the prior art.

| Sample | Peak No. 1 °C. | Peak No. 2 °C. | Peak No. 3 °C. |
|---|---|---|---|
| Commercial 13X Zeolite | 874 | 982 | — |
| LiX(68%) | 773 | 922 | — |
| LiX(97%) | 766 | — | — |
| LiCeX(93%:4%) | 784 | 814 | — |
| LiCeX(92%:6%) | 788 | — | — |

TABLE 7-continued

Thermal Stability of lithium sodium X and LSX samples of the prior art.

| Sample | Peak No. 1 °C. | Peak No. 2 °C. | Peak No. 3 °C. |
|---|---|---|---|
| LiAlX(77%:20%) | 802 | 991 | — |
| LSX | 884 | 973 | — |
| LiLSX(97%) | 770 | 839 | — |
| LiCeLSX(84%:16%) | 805 | 855 | — |
| LiAlLSX(83%:15%) | 786 | 844 | — |
| RELiLSX(81%:15%) NC | 794 | 863 | 942 |

The thermal stabilities of the X- and LSX - based adsorbents of this invention (rows 4 to 6 and 9 to 11, respectively of Table 7) are improved compared to those of the Na, Li samples of the prior art with equal Li levels. Significant advantages accrue from trivalent ion exchange at >5% in terms of significant improvements in thermal stability without any loss in adsorption performance.

EXAMPLE 6

Simulated PSA performance of trivalent ion, lithium X and LSX.

The PSA simulation procedure utilized in this Example rigorously accounts for the equilibrium characteristics of the adsorbent and the mass balances of the gas components under isothermal conditions. For a given feed composition and flow rate, and product/purge composition, the product and purge flow rates, and the low pressure product flow rate and composition are calculated. This allows the direct calculation of $O_2$ recoveries and production for a given process cycle time, and the calculation of the specific power using arbitrary machine efficiencies.

These simulation procedures are reliably used to rank the relative PSA performances of development adsorbents versus reference adsorbents (whose PSA performances are well characterized) in a given process or to investigate the trends in performance of adsorbents as a function of changes in process variables.

The results in Table 8 show examples of simulations of a PSA process operated between absolute pressures of 1.25 atmospheres and 0.25 atmospheres in which air is fed to the adsorbent at 25° C., and the oxygen enriched product containing 2% residual nitrogen is partly used as a purge. The good PSA performance of the adsorbents of this invention are clearly demonstrated in these simulations.

TABLE 8

Simulated PSA performance of the trivalent ion, lithium X and LSX samples of this invention and comparative samples.

| Sample | Relative $O_2$ Recovery | Relative $O_2$ Production | Relative Power Usage |
|---|---|---|---|
| Commercial 13X Zeolite | 100 | 100 | 100 |
| Commercial CaA Zeolite | 120 | 105 | 82 |
| CeX(13%) | 94 | 65 | 107 |
| AlX(24%) | 84 | 49 | 121 |
| LiX(68%) | 88 | 55 | 115 |
| LiX(85%) | 120 | 118 | 82 |
| LiX(94%) | 135 | 159 | 72 |
| LiX(97%) | 148 | 219 | 65 |
| LiCeX(93%:4%) | 143 | 210 | 67 |

TABLE 8-continued

Simulated PSA performance of the trivalent ion, lithium X and LSX samples of this invention and comparative samples.

| Sample | Relative $O_2$ Recovery | Relative $O_2$ Production | Relative Power Usage |
|---|---|---|---|
| LiCeX(92%:6%) | 144 | 215 | 66 |
| LiAlX(77%:20%) | 136 | 167 | 71 |
| LSX | 111 | 125 | 90 |
| CeLSX(42%) | 72 | 46 | 143 |
| LiLSX(79%) | 130 | 140 | 75 |
| LiLSX(99%) | 159 | 328 | 59 |
| LiCeLSX(84%:16%) | 148 | 225 | 64 |
| LiAlLSX(83%:15%) | 158 | 301 | 60 |
| RELiLSX(81%:15%) NC | 154 | 280 | 61 |

The above examples show that the adsorbents of the invention possess significantly better adsorption capacities for nitrogen compared to lithium X and lithium LSX with equivalent lithium cation contents. The examples further show that the adsorbents of the invention have higher separation factors for nitrogen-oxygen mixtures compared with lithium X and lithium LSX with equivalent lithium cation contents. These separation factors are as high as those for the LiLSX adsorbent with the highest possible lithium-cation content, i.e. about 97%. The examples also show that the adsorbents of the invention exhibit improved thermal stability compared to the corresponding trivalent metal free, lithium exchanged samples.

Although the invention has been described with particular reference to specific experiments, these experiments are merely exemplary of the invention and variations are contemplated. For example, the adsorption process can include various adsorption steps. Similarly the adsorbents of the invention can comprise other combinations of components than those illustrated in the examples, and the adsorbents can be prepared by other techniques, such as solid state ion exchange. Furthermore, the adsorbents of the invention can be used to separate nitrogen from various other gases, such as methane and carbon tetrafluoride. The scope of the invention is limited only by the breadth of the appended claims.

What is claimed is:

1. A method of separating nitrogen from a gas mixture comprising passing said gas mixture through at least one adsorption zone containing a type X zeolite whose cations comprise about 50 to about 95% lithium, about 4 to about 50% trivalent ions selected from aluminum, scandium, gallium, iron (III), chromium (III), indium, yttrium, single lanthanides, mixtures of two or more lanthanides, and mixtures of these, and 0 to about 15% of residual ions selected from sodium, potassium, ammonium, calcium, strontium, magnesium, barium, zinc, copper II and mixtures of these, thereby preferentially adsorbing nitrogen from said gas mixture.

2. The process of claim 1, wherein said type X zeolite has a silicon to aluminum ratio in the range of about 0.9 to 1.25.

3. The process of claim 2, wherein the preferential absorption of nitrogen form said gas mixture is carried out at a temperature in the range of about −190° to about 70° C. and an absolute pressure in the range of about 0.7 to 15 bar.

4. The process of claim 2, wherein said method is a cyclic adsorption process selected form pressure swing adsorption, temperature swing adsorption or a combination of these.

5. The process of claim 4, wherein said cyclic adsorption process is pressure swing adsorption and said adsorbent is regenerated at an absolute pressure in the range of about 100 to about 5000 millibar.

6. The process of claim 5, wherein the preferential adsorption of nitrogen from said gas mixture is carried out at a temperature in the range of about −20° to about 50° C. and an absolute pressure in the range of about 0.8 to 10 bar.

7. The process of claim 4, wherein said cyclic adsorption process is temperature swing adsorption and said adsorbent is regenerated at a temperature in the range of about −50° to about 300° C.

8. The process of claim 4, wherein the preferential adsorption of nitrogen from said gas mixture is carried out at a temperature in the range of about −190° to about 70° C. and an absolute pressure in the range of about 0.8 to 10 bar.

9. The method of claim 1, further comprising desorbing nitrogen from said at least one adsorption zone.

10. The method of claim 1 or claim 9, wherein said trivalent ions are selected from aluminum, cerium, lanthanum, mixtures of two or more lanthanides, and mixtures of these.

11. The method of claim 1 or claim 9, wherein said residual ions are selected from hydronium ion, calcium, strontium, magnesium, zinc, copper (II) and mixtures of these.

12. The method of claim 1, wherein said cations comprise about 70 to about 95% lithium, about 5 to about 30% of said trivalent ions and 0 to about 10% of said residual ions.

13. A cyclic adsorption process for separating nitrogen from a gas mixture comprising nitrogen and one or more of oxygen, argon, helium and hydrogen comprising the steps:
(a) passing said gas mixture through at least one adsorption zone containing as adsorbent a type X zeolite whose cations comprise about 50 to about 95% lithium, about 4 to about 50% trivalent ions selected from aluminum, cerium, lanthanum, mixtures of two or more lanthanides in which the combined weight of lanthanum, cerium, praseodymium and neodymium ions present in the mixture comprises at least 50% of the total weight of the mixture, and mixtures of these, and 0 to about 10% of residual ions selected from sodium, potassium, hydronium, ammonium, calcium, strontium, magnesium, barium, zinc, copper (II) and mixtures of these, thereby preferentially adsorbing nitrogen from said gas mixture; and
(b) desorbing nitrogen from said at least one adsorption zone.

14. The process of claim 13, wherein said type X zeolite has a silicon to aluminum ratio in the range of about 0.9 to 1.1.

15. The process of claim 13 or claim 14, wherein said cyclic adsorption process is selected from pressure swing adsorption, temperature swing adsorption or a combination of these.

16. The process of claim 15, wherein the preferential adsorption of nitrogen from said gas mixture is carried out at a temperature in the range of about −190° to about 70° C. and an absolute pressure in the range of about 0.7 to 15 bar.

17. The process of claim 16, wherein said cyclic swing adsorption and said adsorbent is regenerated at an absolute pressure in the range of about 100 to about 5000 millibar.

18. The process of claim 17, wherein the preferential absorption of nitrogen form said gas mixture is carried out at a temperature in the range of about −20° to about 50° C. and an absolute pressure in the range of about 0.8 to 10 bar.

19. The process of claim 16, wherein said cyclic adsorption process is temperature swing adsorption and said adsorbent is regenerated at a temperature in the range of about 0° to about 300° C.

20. The process of claim 13, wherein said adsorbent is at least partly regenerated by countercurrent depressurization.

21. The process of claim 13, wherein said adsorbent is further regenerated by depressurization to subatmospheric pressure by means of vacuum.

22. The process of claim 13, wherein said adsorbent is further regenerated by purging the bed with nonadsorbed product gas from step (a).

23. Type X zeolite whose cations comprise about 50 to about 95% lithium, about 4 to about 50% trivalent ions selected from aluminum, scandium, gallium, iron (III), chromium (III), indium, yttrium, single lanthanides, mixtures of two or more lanthanides and mixtures of these, and 0 to about 15% of residual ions selected from sodium, potassium, ammonium, hydronium, calcium, strontium, magnesium, barium, zinc, copper II and mixtures of these.

24. The zeolite of claim 23, wherein said cations comprise about 70 to about 95% lithium, about 5 to about 30% of said trivalent ions and 0 to about 10% of said residual ions.

25. The zeolite of claim 23 or claim 24, wherein said trivalent ions are selected from aluminum, cerium, lanthanum, mixtures of two or more lanthanides in which the total lanthanum, cerium, praseodymium and neodymium ions present in the mixture comprises at least 50% of the total lanthanide ions, and mixtures of these.

26. The zeolite of claim 25, wherein the atomic ratio of silicon to aluminum in the zeolite lattice is between 0.9 and 1.10.

27. The zeolite of claim 23 or claim 24, wherein said residual ions are selected from hydronium ion, calcium, strontium, magnesium, zinc, copper II and mixtures of these.

28. The zeolite of claim 23, wherein the atomic ratio of silicon to aluminum in the zeolite lattice is between 0.9 and 1.25.

29. The zeolite of claim 23, wherein said cations consist substantially of lithium and said trivalent ions.

30. A process for preparing a lithium- and trivalent ion-exchanged type X zeolite comprising the steps:
(a) contacting an aqueous solution of a salt of a trivalent ion selected from aluminum, scandium, gallium, iron (III), chromium (III), indium, yttrium, single lanthanides, mixtures of two or more lanthanides and mixtures of these with a type X zeolite having as exchangeable cations sodium ions, potassium ions, ammonium ions or mixtures of these until about 4 to about 50 equivalent percent of the exchangeable cations are replaced with one or more of said trivalent ions; and
(b) contacting an aqueous solution of a lithium salt with the trivalent ion-exchanged product of step (a), thereby producing an at least binary-exchanged type X zeolite containing about 50 to about 95 equivalent percent lithium ions and about 4 to about 50 equivalent percent trivalent ions.

31. A process for preparing a lithium- and trivalent ion-exchanged type X zeolite comprising the steps:
(a) contacting an aqueous solution of a lithium salt with a type X zeolite having as exchangeable cations sodium ions, potassium ions, ammonium ions or mixtures of these until about 50 to about 95 equivalent percent of the exchangeable cations are replaced with lithium ions; and
(b) contacting an aqueous solution of a salt of a trivalent ion selected from aluminum, scandium, gallium, iron (III), chromium (III), indium, yttrium, single lanthanides, mixtures of two or more lanthanides and mixtures of these with the lithium-exchanged product of step (a), thereby producing an at least binary-exchanged type X zeolite containing about 50 to about 95 equivalent percent lithium ions and about 4 to about 50 equivalent percent trivalent ions.

32. A process for preparing a lithium- and trivalent ion-exchanged type X zeolite comprising contacting an aqueous solution of a salt of lithium and a salt of a trivalent ion selected from aluminum, scandium, gallium, iron (III), chromium (III), indium, yttrium, single lanthanides, mixtures of two or more lanthanides and mixtures of these with a type X zeolite having as exchangeable cations sodium ions, potassium ions, ammonium ions or mixtures of these until about 50 to about 95 equivalent percent of the exchangeable cations are replaced with lithium ions and about 4 to about 50 equivalent percent of the exchangeable cations are replaced with one or more of said trivalent ions.

33. The process of any one of claims 30, 31 and 32, wherein said trivalent ions are selected from aluminum, cerium, lanthanum, mixture of two or more lanthides in which the total lanthanum, cerium, praseodymium and neodymium ions present in the mixture comprises at least 50% of the total lanthanide ions, and mixture of these.

34. The process of any one of claims 30, 31 and 32, wherein said type X zeolite is low silicon X zeolite.

* * * * *